UNITED STATES PATENT OFFICE.

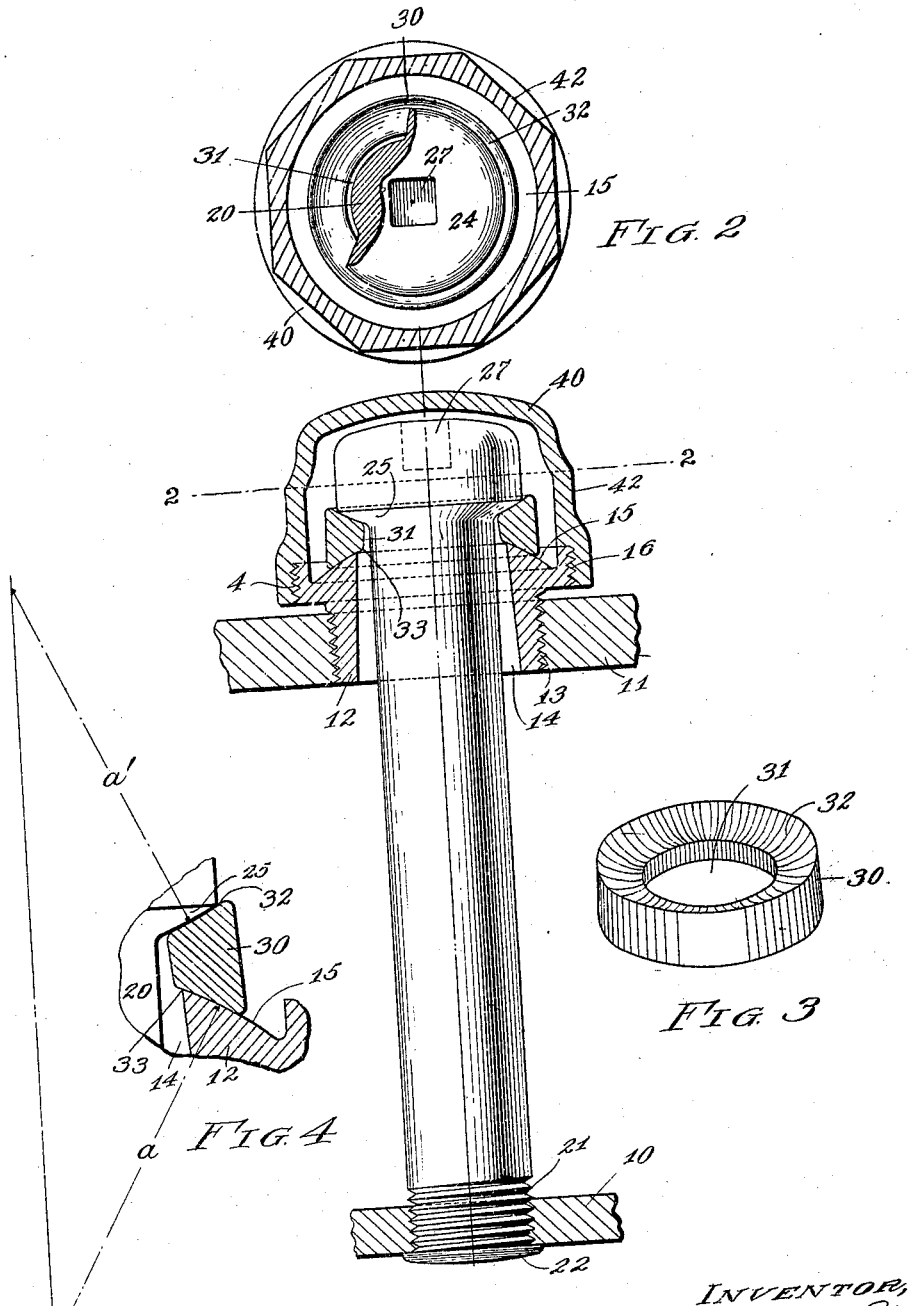

CHARLES F. KAHLER, OF CLEVELAND, OHIO.

COMPENSATING BOLT CONNECTION.

1,046,600.  Specification of Letters Patent.  Patented Dec. 10, 1912.

Application filed November 27, 1911. Serial No. 662,536.

*To all whom it may concern:*

Be it known that I, CHARLES F. KAHLER, a citizen of the United States, residing at Cleveland, in the county of Cuyahoga and State of Ohio, have invented a certain new and useful Improvement in Compensating Bolt Connections, of which the following is a full, clear, and exact description, reference being had to the accompanying drawings.
This invention relates to a device adapted to form a head for a stay which connects two members, between which there may be some relative movement, the device being arranged to automatically adjust itself to compensate for such movement.

The device is of general application and may be said to consist broadly of a connecting member, a seat and a movable member interposed between the connecting member and seat, the engaging surfaces of such parts being curved to allow a compensating tipping of the intermediate member in case of relative movement between the connecting member and seat.
More particularly, the invention comprehends a device for forming a self-adjusting seat for the end of a tension member and, in that aspect, includes the combination of a tension rod having a convex head, a convex seat facing the convexity of the head, and an interposed annular member loosely surrounding the rod and concave on its opposite sides to engage the convex surfaces mentioned. I have found that the best results are obtained by making the convex and concave surfaces mentioned zones of the same sphere, and my invention includes also such characteristic.

A specific instance of the tension rod and seat last referred to, to which my invention is well adapted, is a so-called flexible stay-bolt adapted to be connected with two boiler sheets to form a tie between them, while allowing one sheet to expand or contract with reference to the other. Such stay bolts are commonly employed in locomotive and other boilers between the fire box sheet and an outer shell of the boiler; and to accommodate the expansion and contraction of the inner sheet it has been customary to make the outer end with a spherical seat mounted in a bushing secured in the outer sheet. With such devices, if the stay bolt is screwed tight in the inner sheet, there is always a bending of the stay bolt during the expansion or contraction, with consequent tendency to loosen while, to secure the bolt flexibly to the inner sheet not only increases the expense, but introduces difficulties in the way of inaccessible movable parts, which being adjacent to the fire box, are liable to become ineffective.

In addition to the general applications of my device, one of the objects of my invention is to provide a stay bolt with fastening means so arranged that the shifting of one end of the bolt will not throw a strain on the bolt or the fastening in the other sheet, or tend to loosen the bolt or fastening. To this end, I provide a bolt which is secured tight to the inner sheet and may shift bodily on the outer sheet, so that the bolt may change its place as the inner sheet expands or contracts without bending the bolt.

The invention in the more particular aspect now under consideration includes the means by which I accomplish this, comprising broadly a bolt secured tightly to the inner sheet and seating on a movable member, which has a changeable seat on a bushing secured to the outer sheet.
The inner side of my bolt head is spherically formed and the outer face of the bushing is spherical about the same radius, and the movable member is spherically concave on both sides on the same radius. With such construction, when the inner end of the bolt changes position, the bolt does not bend, but the outer end shifts, riding up or down on the movable member, which, in turn, rides down or up on the face of the bushing.

A satisfactory form of my stay bolt, which is also comprised within my invention, is shown in the drawing hereof and is hereinafter more fully described.

In the drawing, Figure 1 is a transverse section through two boiler sheets provided with a stay bolt of my invention connecting them; Fig. 2 is a cross section of the stay bolt and its cap on the line designated 2—2 of Fig. 1; Fig. 3 is a perspective view of the movable member on which the bolt head seats; Fig. 4 is a diagram in the nature of an enlarged section, illustrating the curvature of the movable member and the co-operating surfaces.
As shown in Fig. 1, 10 represents the inner boiler sheet, and 11 the outer sheet. 12 is a bushing having external screw threads 13 by which it is screwed into the outer sheet. This bushing has a bore 14 flaring toward the inner sheet. The outer face of the bushing has a spherical zone, as shown at 15, and beyond this spherical portion there is an annular flange having external threads 16. 20 indicates the stay bolt proper. This is shown as having screw threads 21 by which it engages the inner sheet, the end of the bolt being upset at 22 on the fire side of this sheet to make a tight and permanent connection. Near its outer end the bolt is provided with the head 24, which has on its under portion about the shank a spherical zone 25. Between the zone 25 of the bolt and the zone or seat 15 of the bushing is a movable ring or seat 30. This ring has a central opening 31 larger than the diameter of the bolt 20, and on its upper and lower face it is concaved spherically on the same radius as the zones 15 and 25. This is illustrated in Fig. 4, wherein the radius of the zone 15 and the under face of the ring 30 is designated $a$, and the radius of the upper face of the ring and the zone 25 is designated $a'$. These two radii are equal.

In installing the construction above described, the bushing 12 is screwed in the outer sheet, and the bolt, with the ring surrounding it, has its shank passed through the bushing and screwed tight into the inner sheet. For this purpose the bolt may have an angular socket 27 in its upper end, or it may be otherwise formed for engagement by a suitable wrench. When in place the inner end of the bolt is upset, as shown in Fig. 1. In this position of the bolt the ring is clamped snugly between the bolt head and the face of the bushing. Now, in such construction, if the expansion or contraction of the inner sheet tends to move the bolt toward the right of Fig. 1, for example, the ring 30 moves toward the right so that it travels downwardly on the spherical seat 15, causing the left hand portion to rise. At the same time, the bolt head slides downwardly on the rising left hand portion and rides up on the falling right hand portion. Accordingly, an automatic adjustment takes place toward the right, half of the movement being between the ring 30 and the seat 15 and the other half between the head and the ring. The operation is similar for any direction of movement of the bolt. Part of the movement is taken by the change of the ring on the seat 15 and part by the change of the bolt head on the ring. Furthermore, any distortion of the inner sheet which tends to swing the bolt about a center is accommodated by the spherical inner seat of the head. Accordingly, my construction relieves the bolt from any bending strain, and there is no tendency to loosen the inner end. At the same time, the connection between the bolt and the outer fastening is always maintained tight.

It is desirable to secure a cap over the outer end of the stay bolt. I have shown such cap in Figs. 1 and 2 designated 40. As shown, it has an arched top portion standing some distance outside of the bolt head, and its wall is provided with an internal thread 41 by which it may be screwed onto the thread 16. To enable it to be conveniently turned I flatten its exterior surface, as shown at 42, whereby a wrench may be conveniently applied.

Among the advantages of the structure shown, it should also be mentioned that the head of the bolt is readily and conveniently accessible without danger of loosening the bolt or the socket in the boiler sheet. This accessibility provides for testing the bolt whenever desired.

Having thus described my invention, what I claim is:

1. In a device of the character described, the combination of a connecting member, a seat and a member interposed between the connecting member and seat and movable with reference to both of them, the engaging surfaces of said seat and interposed member and of said interposed member and connecting member respectively being oppositely curved to allow a compensating tipping of the interposed member in case of relative movement between the connecting member and seat.

2. In a device of the character described, the combination of a tension member having a head with a convex face, a seat, a ring loosely surrounding the tension member between the seat and head and movable with reference to both the member and seat and having a concave surface which the said convex head engages and a surface non-concentric therewith which engages the seat.

3. The combination of a tension rod having a convex head, a convex seat facing the convexity of the head, and an interposed annular member loosely surrounding the rod and concave on its opposite sides to engage the convex surfaces mentioned.

4. The combination of a member having a convex head, a convex seat facing the convexity of the head, and an interposed member concave on its opposite sides to engage the convex surfaces mentioned, all of such concave and convex surfaces being spherical and of the same radius.

5. In a device of the character described, the combination of a tension member, a head thereon having an annular spherical convex surface, an annular seat surrounding the tension member and free therefrom, and having a spherical convex surface, and an interposed ring surrounding the tension member and having its opposite faces spherically concave to engage said convex surfaces respectively.

6. The combination of a rod provided with a head which has a convex surface surrounding the rod, a bushing loosely surrounding the rod and providing a seat, and an intermediate member between the bushing and head and movable with reference to both of them, said intermediate member being in the form of a ring having an inner diameter greater than the diameter of the rod and bearing at one side on the bushing and shiftable thereon in a direction non-concentric of the head and on its other side formed concavely corresponding to the convexity of the head.

7. In a device of the character described, the combination of a rod provided with a head which has a convex seating surface, a bushing adapted to loosely surround the rod and having a convex seating surface, an interposed ring having its opposite faces formed concavely and bearing against the head and bushing, all of such convex and concave surfaces being spherical and of the same radius.

8. The combination with the inner and outer sheets of a boiler of a stay-bolt secured at its inner end to the inner sheet and having a head at its outer end, and a shiftable member interposed between the head and outer sheet adapted to enable the head to slide parallel with the outer sheet and rock with reference thereto.

9. The combination, with the inner and outer sheets of a boiler, of a stay bolt screwed into the inner sheet, a bushing secured to the outer sheet, and a member between the head of the bolt and the bushing and movable with reference to both of them and provided with non-concentric opposite faces enabling the bolt to bodily shift and still maintain a tight connection between the sheets.

10. The combination, with the inner and outer sheets of a boiler, of a stay bolt screwed into the inner sheet, a bushing screwed into the outer sheet, and a ring between the head of the bolt and the bushing concaved on its opposite sides and movable with reference to both the bolt and bushing which are convexly formed to seat it, thereby enabling the bolt to shift on the ring and the ring on the bushing.

11. The combination, with the inner and outer sheet of a boiler, of a stay bolt screw threaded into the inner sheet and having a head, the inner side of which has a convex spherical curvature, a bushing surrounding the shank of the bolt and screw threaded into the outer sheet and having an outer surface which has a convex spherical curvature, and a ring interposed between the aforesaid head and bushing and having correspondingly concaved inner and outer surfaces engaging said convex surfaces respectively.

12. The combination, with a stay bolt threaded on one end and having a head at the other end with a spherical convex inner face, a bushing having a spherical convex face, and a ring surrounding the shank and located between the head and bushing and having its inner and outer faces correspondingly concaved to engage such convexed faces respectively.

13. The combination of a bolt having a head and a shank and an intermediate portion connecting the head and shank and having a convex spherical surface, a bushing surrounding said shank and having an outer convex spherical curved face, a movable intermediate ring adapted to surround the bolt shank and having concave inner and outer surfaces engaging said convex faces respectively, the bushing having an external screw thread by which it may be screwed into the outer sheet, and the shank of the bolt having an external screw thread by which it may be screwed into the inner sheet.

14. The combination of a bolt having a head at one end and a shank connected with the head by a flaring portion which has a spherical face, a bushing adapted to surround said bolt and having an outer surface which is correspondingly spherical, a movable intermediate ring adapted to surround the bolt shank and having concave inner and outer surfaces which are complementarily spherical, the bushing having external screw threads by which it may be screwed into the outer sheet, and having a flange outside of the seat thereon, which flange has external screw threads, and a cap adapted to inclose the head and ring and screwed onto said last mentioned threads.

15. In a device of the character described, the combination of a seat, a connecting member, and a member interposed between the seat and connecting member and having non-concentric surfaces bearing on each of them and being movable with reference to both of them.

16. In a compensating bolt connection, the combination of a bolt having a head, an annular seat surrounding the bolt and free from it, and a ring interposed between the bolt head and seat and movable with reference to both of them and oppositely curved on its opposite sides to provide for a compensating tipping in case of relative movement between the connecting member and seat.

In testimony whereof, I hereunto affix my signature in the presence of two witnesses.

CHARLES F. KAHLER.

Witnesses:
ALBERT H. BATES,
BRENNAN B. WEST.